United States Patent
Wright

(10) Patent No.: US 9,283,944 B2
(45) Date of Patent: Mar. 15, 2016

(54) COMPRESSOR AFTERCOOLER BYPASS WITH INTEGRAL WATER SEPARATOR

(71) Applicant: NEW YORK AIR BRAKE, LLC, Watertown, NY (US)

(72) Inventor: Eric C. Wright, Evans Mills, NY (US)

(73) Assignee: New York Air Brake, LLC, Watertown, NY (US)

( * ) Notice: Subject to any disclaimer, the term of this patent is extended or adjusted under 35 U.S.C. 154(b) by 107 days.

(21) Appl. No.: 14/306,660

(22) Filed: Jun. 17, 2014

(65) Prior Publication Data

US 2015/0360668 A1    Dec. 17, 2015

(51) Int. Cl.

| B60T 17/02 | (2006.01) |
|---|---|
| B60T 17/00 | (2006.01) |
| B60T 17/04 | (2006.01) |
| B60T 17/22 | (2006.01) |
| F25B 43/00 | (2006.01) |

(52) U.S. Cl.
CPC .............. *B60T 17/004* (2013.01); *B60T 17/006* (2013.01); *B60T 17/02* (2013.01); *B60T 17/04* (2013.01); *B60T 17/228* (2013.01); *F25B 43/00* (2013.01); *Y10T 137/0324* (2015.04); *Y10T 137/1963* (2015.04); *Y10T 137/2562* (2015.04); *Y10T 137/2574* (2015.04)

(58) Field of Classification Search
CPC ..... B60T 17/004; B60T 17/006; B60T 17/02; B60T 17/04; F04B 39/06; F25B 43/00; Y10T 137/0324
USPC .......................................................... 137/62
See application file for complete search history.

(56) References Cited

U.S. PATENT DOCUMENTS

| 5,114,315 | A * | 5/1992 | Kaltenthaler et al. | B60T 17/006 417/18 |
|---|---|---|---|---|
| 5,927,399 | A | 7/1999 | Kazakis et al. | |
| 6,045,197 | A | 4/2000 | McGaugh | |
| 6,283,725 | B1 | 9/2001 | Goettel et al. | |
| 6,540,817 | B1 | 4/2003 | Hachimaki | |
| 2012/0321486 | A1* | 12/2012 | Scarpinato et al. | ..... F04B 39/02 417/228 |
| 2014/0216578 | A1* | 8/2014 | Inui | ....................... B60T 15/021 137/565.18 |

FOREIGN PATENT DOCUMENTS

WO    2011093135    8/2011

OTHER PUBLICATIONS

International Search Report Form PCT/ISA/220, International Application No. PCT/US2014/042672, pp. 1-11, Dated Mar. 23, 2015.

* cited by examiner

*Primary Examiner* — Kevin Lee
(74) *Attorney, Agent, or Firm* — David L. Nocilly; Bond Schoeneck & King, PLLC

(57) ABSTRACT

An aftercooler bypass system for selectively allowing a portion of the hot compressed gases exiting an air compressor to bypass an aftercooler and intermix with the cooled compressed gases exiting the aftercooler in order to ensure that the cooled compressed gases are above a threshold temperature when the ambient air temperature is at or below freezing. The system includes a valve for controlling the amount of air diverted around the aftercooler and a mixing chamber for allowing the valved air supply to intermix with the aftercooler outlet stream. Temperature sensor may be used to measure ambient air temperature and downstream air temperature to control the opening and closing of the valve and maintain the desired mixed air temperature.

19 Claims, 3 Drawing Sheets

COMPRESSOR AFTERCOOLER BYPASS WITH INTEGRAL WATER SEPARATOR

BACKGROUND OF THE INVENTION

1. Field of the Invention

The present invention relates to compressor aftercooler bypass systems and, more particularly, to an aftercooler bypass having integral water separator.

2. Description of the Related Art

Railway braking systems rely on, among other things, air compressors to generate the compressed air of the pneumatic braking system. As the compression of air results in heating of the air to temperatures that are too hot for braking systems, railway air compressors are generally provided with an aftercooler to cool the compressed air to 20° F. to 40° F. above ambient temperature. The cooled, compressed air is then supplied to the air supply system of a locomotive through a compressor discharge pipe that connects to the first main reservoir. This discharge pipe may be as long as 30 feet, and may necessarily include several ninety degree bends. In winter operation, when the ambient air temperature can be well below freezing (32° F.), water vapor and water aerosol in the compressed air stream can freeze in the compressor discharge pipe, thereby at least partially blocking the flow of air to the braking system and adversely interfering with the operation of the braking system.

As is well known to those skilled in the art, and described by a body of knowledge known as psychrometrics, the maximum total amount of water vapor in a volume of air is strongly dependent on the air temperature, as warm air is able to hold much more water vapor than cool air. This effect is characterized as the partial pressure saturation pressure. Further, as is also well known, the water vapor saturation partial pressure is the maximum water vapor in air at that temperature, regardless of air pressure. As air is compressed, the water vapor in the air will also be compressed, until the water vapor partial pressure equals the saturation pressure. The net result is that for a railway compressor with a 10.5:1 compression ratio, intake air as dry as 9.5 percent relative humidity will be at 100 percent relative humidity after compression. Lastly, due to the thermodynamics of air, the temperature of the air increases significantly as a result of compression. For a two-stage railway compressor, the second stage discharge temperature may be as high as 300° F. above ambient temperature.

Thus, based on the temperature dependent water vapor holding capacity of air and the effect of the compression on the water holding capacity of the air, the hot air discharged from the second stage of an air compressor may contain a significant amount of water vapor. As this hot air flows through a compressor aftercooler, the air temperature is reduced to 20° F. to 40° F. above ambient temperature. Air at this temperature can hold much less water vapor than air at the second stage discharge temperature, so the excess water vapor precipitates out as liquid water and/or water aerosol. When this liquid water is transported into the compressor discharge pipe, it may freeze if the discharge pipe and ambient air are cold enough. In addition, because the air exiting the compressor is 20° F. to 40° F. above ambient air temperature, it is subject to further cooling in the compressor discharge pipe. As the air temperature drops in the pipe, further water will precipitate out thereby compounding the problem.

BRIEF SUMMARY OF THE INVENTION

The present invention comprises an air compressor for railway braking system that includes an integrated aftercooler bypass valve and integral water separator to prevent freezing of the compressor discharge pipe in winter operation. An integrated aftercooler bypass valve controllably connects the outlet of the second stage of the compressor to the outlet of the aftercooler. When the aftercooler bypass valve is open, then a fraction of the hot air from the compressor second stage outlet flows to the mixing chamber of the aftercooler bypass valve assembly, thereby bypassing the aftercooler. The remaining fraction of the hot air from the compressor second stage outlet flows through the aftercooler and is cooled to a temperature of 20° F. to 40° F. above ambient temperature as in conventional aftercooling systems. This cooled fraction of air from the aftercooler is directed to a second inlet port on the aftercooler bypass valve assembly to the mixing chamber, where it is mixed with the hot air from the first fraction of air. The combined air has a new temperature which is a mass-temperature average of the two air streams and the new outlet air temperature is the result of the relative mass flow of the two air streams, which is a consequence of the flow capacity of the open bypass valve. For example, the flow capacity of the open bypass valve could be selected to provide a new, mixed compressor outlet temperature of 140° F. above ambient temperature so that even if the ambient air temperature was −40° F., the outlet air temperature presented to the discharge pipe would be 100° F. The outlet air temperature can therefore be selected to have a high-enough temperature so that even after flowing through the cold discharge pipe the air has sufficient heat that it remains above 32° F., thus preventing freezing in the pipe.

When the bypass valve is closed, all of the hot air from the compressor second stage outlet flows through the aftercooler and is cooled to a temperature of 20° F. to 40° F. above ambient temperature. The aftercooler bypass valve is controlled to be opened or closed depending on optionally either ambient temperature and/or the compressor system outlet temperature. When the ambient temperature is below a threshold, such as 32° F., then the aftercooler bypass valve is opened. At temperatures above the control temperature, the aftercooler bypass valve is closed.

The aftercooler bypass valve assembly optionally includes an integral water separator to remove the liquid and aerosol water from the outlet air stream. By making the water separator part of the aftercooler bypass valve assembly, the water separator is operational when the aftercooler bypass valve is open and when it is closed. Furthermore, packaging the water separator with the aftercooler bypass valve assembly simplifies the design, reduces the cost, eliminates piping connections and makes for a more compact arrangement.

BRIEF DESCRIPTION OF THE SEVERAL VIEWS OF THE DRAWING(S)

The present invention will be more fully understood and appreciated by reading the following Detailed Description in conjunction with the accompanying drawings, in which.

DETAILED DESCRIPTION OF THE INVENTION

Figure 1:
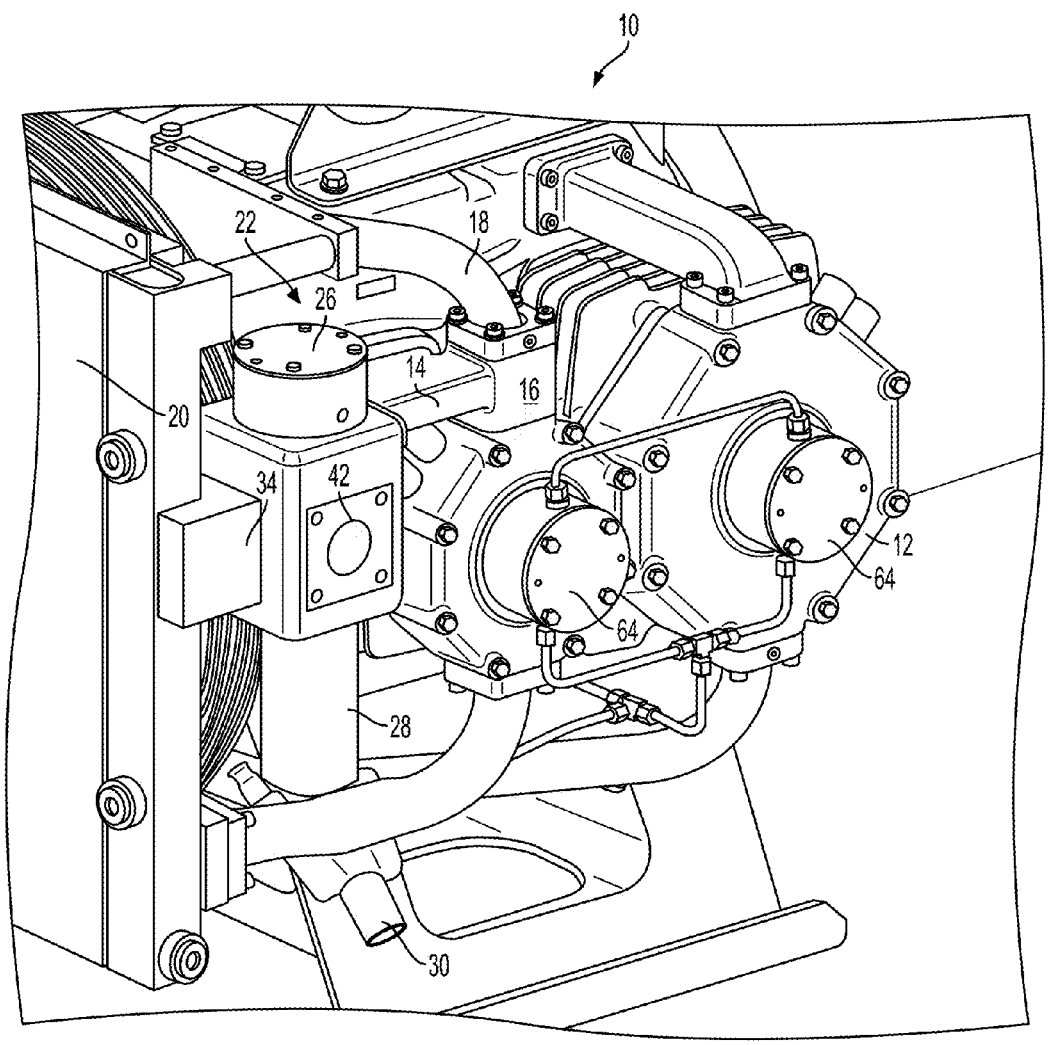
FIG. 1 is a perspective view of an aftercooler bypass system according to the present invention.

Referring now to the drawings, wherein like reference numerals refer to like parts throughout, there is seen in FIG. 1 an after cooler bypass system 10. System 10 is interconnected to an air compressor 12 via a connector duct 14 that is fluidly interconnected to the second stage outlet 16 of compressor 12 so that at least a portion of the air exiting compressor 12 may be redirected to system 10 away from the aftercooler inlet pipe 18 of a conventional aftercooler 20. Connector duct 14 diverts the compressed air exiting outlet 16 of air compressor 12 to a bypass valve assembly 22 having a mixing chamber 24. Mixing chamber 24 is also is interconnected to the discharge flange 34 of aftercooler 20, so that cooled air exiting aftercooler 20 may be intermixed with the hot air diverted by connector duct 14. Valve assembly 22 further comprises a bypass valve 26 that may be selectively opened or closed, or at least partially opened, based on a threshold, such as the ambient air temperature. Valve assembly 22 preferably comprises a water separator 28 attached thereto and positioned proximately to mixing chamber 24 to assist with the removal of water from the intermixed air streams. The intermixed air in mixing chamber 24 may then be provided to the braking system via an outlet flange 42 that can connect to the conventional discharge piping used to conduct compressed air to the main reservoir of the braking system. When bypass valve 26 is closed, the cooled compressed air exiting aftercooler 20 will still pass through mixing chamber 24 so that water separator 28 can remove any undesired water and then exit to the braking system via flange 42.

Bypass valve 26 is preferably dimensioned to provide a predetermined mixing ratio of bypassed air and thus result in a predetermined outlet temperature above ambient temperature when ambient air temperatures fall below as threshold, such as freezing. Alternatively, as explained below, valve 26 may be controlled to adaptively maintain mixed air temperature based on the ambient air temperature. Furthermore, as seen in FIG. 1, aftercooler bypass valve assembly 22 may be formed as a single, integral unit that may be installed or replaced as a single unit for easier installation or repair in the field.

Figure 2:
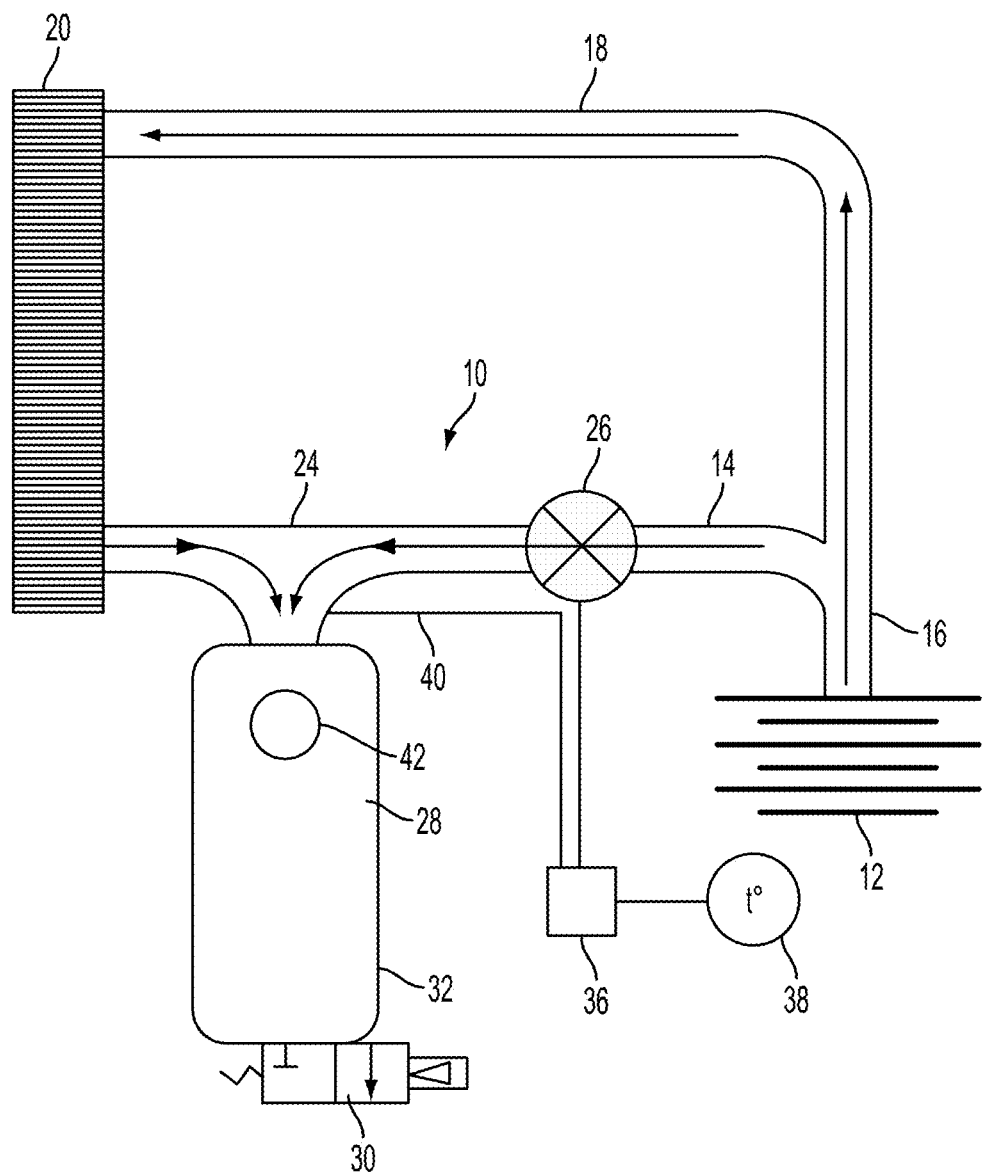
FIG. 2 is a flow diagram of an aftercooler bypass system according to the present invention.

Referring to FIG. 2, bypass valve 26 selectively allows compressed air leaving compressor 12 to bypass aftercooler 20 and then intermix with the cooled air leaving aftercooler 20 by discharge flange 34. Thus, bypass valve assembly 22 provides a direct and short bypass of aftercooler 20 so that when bypass valve 26 is open, the flow resistance through bypass valve assembly 22 is less than the flow resistance through aftercooler 20. As a result, a substantive fraction of hot air will preferentially flow through bypass valve 26 into mixing chamber 24. This arrangement is significantly simpler and less costly than conventional approaches that necessitate the use of a three-way valve to simultaneously block the connection to an aftercooler while opening another connection to an aftercooler bypass line.

As seen in FIG. 1, water separator 28 preferably includes an automatic drain valve 30 to expel liquid and aerosol water from the outlet air stream. While drain valve 30 is shown schematically in FIG. 2 as a solenoid valve on the bottom of the reservoir 32 of water separator 28, drain valve 30 could additionally comprise a pneumatically piloted drain valve at the bottom of the reservoir, with the controlling solenoid integrated into the block of aftercooler bypass valve 22. Reservoir 32 of water separator 28 may include an integral, pneumatic connection between the solenoid valve 30 in the valve block and the pneumatically piloted drain valve in the bottom of the reservoir, so that the water separator reservoir could be removed for maintenance without disturbing electrical wiring or piping.

Figure 3:
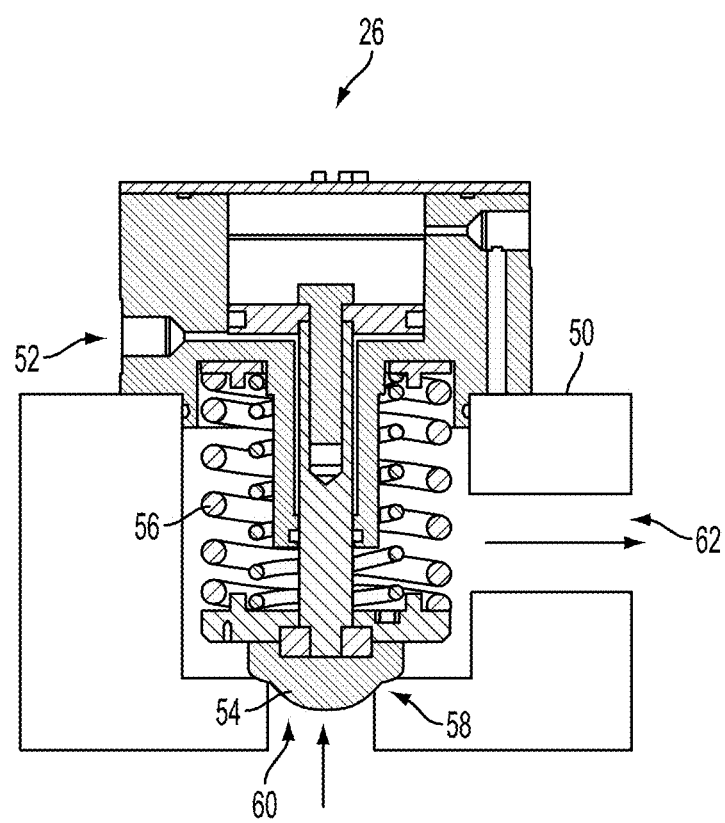
FIG. 3 is a cross-sectional view of an embodiment of a bypass valve according to the present invention.

While bypass valve 26 could be formed using a suitable two-way valve known in the art, bypass valve 26 may also be made in the same manner as the unloading valves 64 of the cylinder heads of air compressor 12, as these valves are designed to operate reliably at the high temperature and pressure of the second stage cylinder outlet. For example, as seen in FIG. 3, bypass valve 26 may comprise a housing 50 having a control input 52 for controlling the position of a valve 54 positioned within housing 50 and biased by one or more springs 56 for movement between a closed position, where valve 52 engaged a seat 58 formed in housing 50, and an open position, where valve 52 allow an inlet port 60 to be in communication with an outlet port 62. Preferably valve 54 and seat 58 form a metal to metal contact for reliable operation at the high temperatures and pressures associated with system 10. Inlet port 60 is interconnected to second stage outlet 16 of compressor 12 by connector duct 14, and outlet port 62 is interconnected to mixing chamber 24. Using the same manufacturing process for both bypass valve 26 and the unloading valves 64 of air compressor 12 reduces the variety of parts necessary for initial manufacture and for periodic remanufacture and maintenance.

While the forgoing description is discussed in the context of a two-state aftercooler bypass valve 26, i.e., either open or closed, bypass valve 26 could optionally be a proportional valve that would allow the outlet temperature of aftercooler 20 to be controlled over a range of temperatures. For example, the outlet temperature could be controlled by an associated controller 36 having an ambient air thermometer 38, or comparable sensor, as well as an inline temperature sensor 40 downstream of mixing chamber 24. Thus, the outlet temperature could be set to 100° F. whenever the ambient temperature is at or below freezing by varying the opening of aftercooler bypass valve 26 to provide the needed high temperature air flow to mixing chamber 24. For example, if the ambient temperature was above 32° F., then the aftercooler bypass controller 36 would close aftercooler bypass valve 26 and all the air volume would flow through the aftercooler so that the compressor outlet temperature is 20° F. to 40° F. above ambient temperature. Similarly, when temperatures were below 32° F., then the aftercooler bypass controller 36 would open bypass valve 26 enough to maintain an outlet temperature of about 100° F. or whatever temperature is desired. Thus, bypass valve 26 and controller 36 may be configured to provide closed-loop control of the outlet temperature, thereby providing a variable mixing ratio and a controllable outlet temperature independent of ambient temperature.

What is claimed is:

1. An aftercooler bypass system, comprising:
   a mixing chamber having a first connector adapted for fluid communication with a hot compressed air outlet of an air compressor and a second connector adapted for fluid communication with a cooled air discharge of an aftercooler;
   a bypass valve positioned between said first connector and said mixing chamber for selectively controlling the amount of hot compressed air that passes through said first connector into said mixing chamber; and
   a water separator positioned proximately to said mixing chamber.

2. The system of claim 1, wherein said water separator includes a drain valve.

3. The system of claim 2, wherein said drain valve is operated pneumatically.

4. The system of claim 1, further comprising a controller operatively interconnected to said bypass valve that is programmed to operate said valve.

5. The system of claim 4, wherein said controller is programmed to open said valve when ambient air temperature falls below a predetermined threshold.

6. The system of claim 4, further comprising an ambient air thermometer electrically interconnected to said controller.

7. The system of claim 5, further comprising a temperature sensor positioned downstream of said mixing chamber.

8. The system of claim 6, wherein said controller is programmed to operate said valve to maintain a predetermined temperature of air downstream of said mixing chamber when ambient air temperature is below a predetermined threshold.

9. A system for protecting against the accumulation of ice in a compressor discharge line, comprising:
- an air compressor having a hot compressed air outlet;
- an aftercooler fluidly interconnected to said hot compressed air outlet and having a cooled air discharge;
- a conduit fluidly interconnected to said hot compressed air outlet;
- a bypass valve having a input port fluidly interconnected to said hot compressed air outlet and an outlet;
- a mixing chamber fluidly interconnected to said outlet of said bypass valve and said cooled air discharge and having an outlet flange; and
- a water separator positioned proximately to said mixing chamber.

10. The system of claim 9, wherein said water separator includes a drain valve.

11. The system of claim 10, wherein said drain valve is operated pneumatically.

12. The system of claim 11, further comprising a controller operatively interconnected to said bypass valve that is programmed to operate said valve.

13. The system of claim 12, wherein said controller is programmed to open said valve when ambient air temperature falls below a predetermined threshold.

14. The system of claim 12, further comprising an ambient air thermometer electrically interconnected to said controller.

15. The system of claim 14, further comprising a temperature sensor positioned downstream of said mixing chamber.

16. The system of claim 15, wherein said controller is programmed to operate said valve to maintain a predetermined temperature of air downstream of said mixing chamber when ambient air temperature is below a predetermined threshold.

17. A method of preventing the accumulation of ice in a compressor discharge line, comprising the steps of:
- diverting a portion of any hot compressed gases that exit an air compressor away from an aftercooler;
- allowing any remaining portion of hot compressed gases to be cooled by said aftercooler;
- providing a mixing chamber in which said cooled compressed gases exiting said aftercooler may intermix with said diverted portion of hot compressed gases and then exit to said compressor discharge line;
- metering the amount of diverted hot compressed gases that are allowed to enter said mixing chamber to intermix with said cooled compressed gases; and
- separating any water from said intermixed gases prior to said gases exiting into said compressor discharge line.

18. The method of claim 17, wherein the step of metering the amount of diverted hot compressed gases that are allowed to enter said mixing chamber and intermix with said cooled compressed gases comprising adjusting the amount of diverted hot compressed gases based on the ambient air temperature.

19. The method of claim 18, wherein the step of metering the amount of diverted hot compressed gases that are allowed to enter said mixing chamber and intermix with said cooled compressed gases further comprises adjusting the amount of diverted hot compressed gases based on the temperature of any air in said compressor discharge line.

* * * * *